(12) United States Patent
Takenaka et al.

(10) Patent No.: US 11,206,725 B2
(45) Date of Patent: Dec. 21, 2021

(54) LIGHTING SYSTEM AND METHOD OF CONTROLLING LIGHTING SYSTEM

(71) Applicant: Panasonic Intellectual Property Management Co., Ltd., Osaka (JP)

(72) Inventors: Toshiaki Takenaka, Osaka (JP); Hirofumi. Konishi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/003,901

(22) Filed: Aug. 26, 2020

(65) Prior Publication Data

US 2021/0068237 A1 Mar. 4, 2021

(30) Foreign Application Priority Data

Aug. 29, 2019 (JP) .............................. JP2019-156635

(51) Int. Cl.
*H05B 47/11* (2020.01)
*H05B 47/155* (2020.01)
(Continued)

(52) U.S. Cl.
CPC ................ *H05B 47/11* (2020.01); *F21K 9/64* (2016.08); *F21V 23/009* (2013.01); *H05B 47/155* (2020.01); *F21Y 2115/30* (2016.08)

(58) Field of Classification Search
CPC ...... H05B 47/11; H05B 47/155; H05B 45/48; H05B 45/54; H05B 45/12; F21K 9/64;
(Continued)

(56) References Cited

U.S. PATENT DOCUMENTS

| 2011/0116520 A1* | 5/2011 | Krijn | F21S 45/70 372/29.02 |
|---|---|---|---|
| 2014/0286365 A1* | 9/2014 | Ishikawa | F21V 25/04 372/29.01 |

(Continued)

FOREIGN PATENT DOCUMENTS

| JP | 2000-221108 A | 8/2000 |
|---|---|---|
| JP | 2005-050847 | 2/2005 |

(Continued)

*Primary Examiner* — Renan Luque
(74) *Attorney, Agent, or Firm* — McDermott Will & Emery LLP

(57) ABSTRACT

Lighting system includes light source that includes at least one light-emitting device and emits first light (laser light); wavelength conversion member that converts part of the first light into second light having a different wavelength from that of the first light; an optical system (light guide member) where the first light enters and that applies the first light to wavelength conversion member; optical sensor that receives part of the second light as monitor light and outputs monitor signal corresponding to the intensity of monitor light; and output control circuit that controls light source and optical sensor. Output control circuit performs an optical system inspection of conditions of the optical system and wavelength conversion member and a light source inspection of a condition of light source in accordance with monitor signal, using a time division method.

12 Claims, 11 Drawing Sheets

(51) Int. Cl.
*F21K 9/64* (2016.01)
*F21Y 115/30* (2016.01)
*F21V 23/00* (2015.01)

(58) Field of Classification Search
CPC .......... F21K 9/00; F21V 23/009; F21V 23/00;
F21V 23/0457; F21V 25/00; F21V 25/02;
F21V 25/04; F21V 23/0442; F21Y
2115/30; B60Q 1/04; B60Q 11/00; B60Q
11/005; B60Q 1/0023; B60Q 1/143;
B60Q 2300/146; F21S 41/14; F21S
41/147; F21S 41/16; F21S 41/25; F21S
41/255; F21S 41/285; F21S 41/32; F21S
41/37; F21S 41/39; F21S 41/675; F21S
43/00; F21S 45/00; F21S 48/1145; F21S
48/1159; F21S 48/1225; F21S 41/30;
F21S 45/10; G01J 1/42; G01J 2001/4247;
G01J 3/505; G01J 1/0407; G01J 1/0437;
G01J 1/08; G01J 1/4228; G01J 1/4257;
G01J 1/58; G01M 11/0285; G02B 26/10;
G02B 5/02; G02B 5/32; G03B 21/204;
G03B 21/2066; G03B 21/208; H01S
3/0078; H01S 5/005; H01S 5/022; H01S
5/02296; H01S 5/06808; H01S 5/06825;
H01S 5/0683; G01N 2021/646; G01N
2021/9511; G01N 21/63; G01N 21/6445;
G01N 21/95; G01N 2201/06113
See application file for complete search history.

(56) References Cited

U.S. PATENT DOCUMENTS

| | | | | |
|---|---|---|---|---|
| 2015/0062943 | A1* | 3/2015 | Takahira | F21S 43/26 362/510 |
| 2016/0097822 | A1* | 4/2016 | Hopfgartner | G01R 31/44 324/414 |
| 2017/0139096 | A1* | 5/2017 | Frederiksen | F21S 45/70 |
| 2017/0267175 | A1* | 9/2017 | Ichikawa | B60Q 1/04 |
| 2017/0307164 | A1* | 10/2017 | Atoji | B60Q 11/00 |
| 2017/0322154 | A1* | 11/2017 | Hoehmann | B60Q 11/005 |
| 2017/0322155 | A1* | 11/2017 | Drumm | F21V 13/14 |
| 2018/0039168 | A1* | 2/2018 | Suzuki | G03B 21/2066 |
| 2018/0279455 | A1* | 9/2018 | Huang | H05B 45/54 |
| 2019/0137064 | A1* | 5/2019 | Zozgornik | F21S 41/176 |

FOREIGN PATENT DOCUMENTS

| | | |
|---|---|---|
| JP | 2007-287886 | 11/2007 |
| JP | 2012-216299 A | 11/2012 |
| JP | 2015-125834 A | 7/2015 |
| JP | 2017-213980 | 12/2017 |

* cited by examiner

LIGHTING SYSTEM AND METHOD OF CONTROLLING LIGHTING SYSTEM

CROSS REFERENCE TO RELATED APPLICATION

This application claims the benefit of priority of Japanese Patent Application Number 2019-156635, filed on Aug. 29, 2019, the entire content of which is hereby incorporated by reference.

TECHNICAL FIELD

The present disclosure relates to a lighting system and a method of controlling the lighting system.

BACKGROUND ART

Lighting equipment using semiconductor light-emitting devices has conventionally been known (see Japanese Unexamined Patent Application Publication No. 2017-213980 (PTL 1), for example). In the lighting equipment described in PTL 1, blue laser light emitted from semiconductor laser devices is guided to an imaging lens by a light guide member and collected on a wavelength conversion member by the imaging lens. The laser light excites the wavelength conversion member and is also scattered on the surface of the wavelength conversion member. Then, white light generated from a mixture of yellow light produced by the wavelength conversion member and the blue light scattered on the surface of the wavelength conversion member is emitted to the outside of the lighting equipment.

The aforementioned light guide member stretches from its incident end face where the laser light enters to its exit end face. The semiconductor laser devices are disposed at positions opposing the incident end face of the light guide member, and the wavelength conversion member and a photodetector are disposed at positions opposing the exit end face of the light guide member via the imaging lens.

The photodetector receives the white light including the yellow light emitted from the wavelength conversion member, i.e., mixed light of the yellow light and the blue laser light, and outputs a detection signal to a driving circuit, the detection signal being an electrical signal corresponding to the amount of the received light. The driving circuit controls the laser light in accordance with the detection signal.

SUMMARY

In the lighting equipment described in PTL 1, anomalies may occur in the semiconductor laser devices and the light guide member. These anomalies are able to be detected based on the detection signal obtained from the photodetector. However, it is not possible, with the lighting equipment described in PTL 1, to identify which of the semiconductor laser devices and the light guide member has an anomaly. It may, for example, be possible to identify the location where an anomaly has occurred by adding a photodetector that detects light emitted from the semiconductor laser devices, but this will complicate the configuration of the lighting equipment.

In view of the above, it is an object of the present disclosure to provide a lighting system and the like having a simplified configuration and capable of individually detecting anomalies in light-emitting devices and anomalies in an optical system and a wavelength conversion member.

In order to solve the above-described problem, the lighting system according to one aspect of the present disclosure includes a light source that includes at least one light-emitting device and emits first light, a wavelength conversion member that converts part of the first light into second light having a different wavelength from a wavelength of the first light, an optical system where the first light enters and that applies the first light to the wavelength conversion member, an optical sensor that receives part of the second light as monitor light and outputs a monitor signal corresponding to an intensity of the monitor light, and an output control circuit that controls the light source and the optical sensor. The output control circuit performs an optical system inspection and a light source inspection in accordance with the monitor signal, using a time division method, the optical system inspection being an inspection of conditions of the optical system and the wavelength conversion member, and the light source inspection being an inspection of a condition of the light source.

In order to solve the above-described problem, in a method of controlling a lighting system according to one aspect of the present disclosure, the lighting system includes a light source that includes at least one light-emitting device and emits first light, a wavelength conversion member that converts part of the first light into second light having a different wavelength from a wavelength of the first light, an optical system where the first light enters and that applies the first light to the wavelength conversion member, and an optical sensor that receives part of the second light as monitor light and outputs a monitor signal corresponding to an intensity of the monitor light. The method of controlling a lighting system includes (i) inspecting conditions of the optical system and the wavelength conversion member in accordance with the monitor signal, and (ii) inspecting a condition of the light source in accordance with the monitor signal, (i) and (ii) being performed using a time division method.

According to the present disclosure, it is possible to provide a lighting system and the like having a simplified configuration and capable of individually detecting anomalies in the light-emitting devices and anomalies in the optical system and the wavelength conversion member.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

An embodiment of the present disclosure will be described hereinafter in detail with reference to the drawings.

The embodiment described below illustrates one generic or specific example of the present disclosure. Numerical values, shapes, materials, constituent elements, the arrangement and connection form of constituent elements, steps, a sequence of steps, and so on in the following embodiment are merely one example, and do not intend to limit the scope of the present disclosure. Among constituent elements described in the following embodiment, those that are not recited in any independent claim, which represents the broadest concept, are described as optional constituent elements.

Embodiment

A lighting system and a method of controlling the lighting system according to an embodiment will be described.

[1. Overall Configuration]

Figure 1:
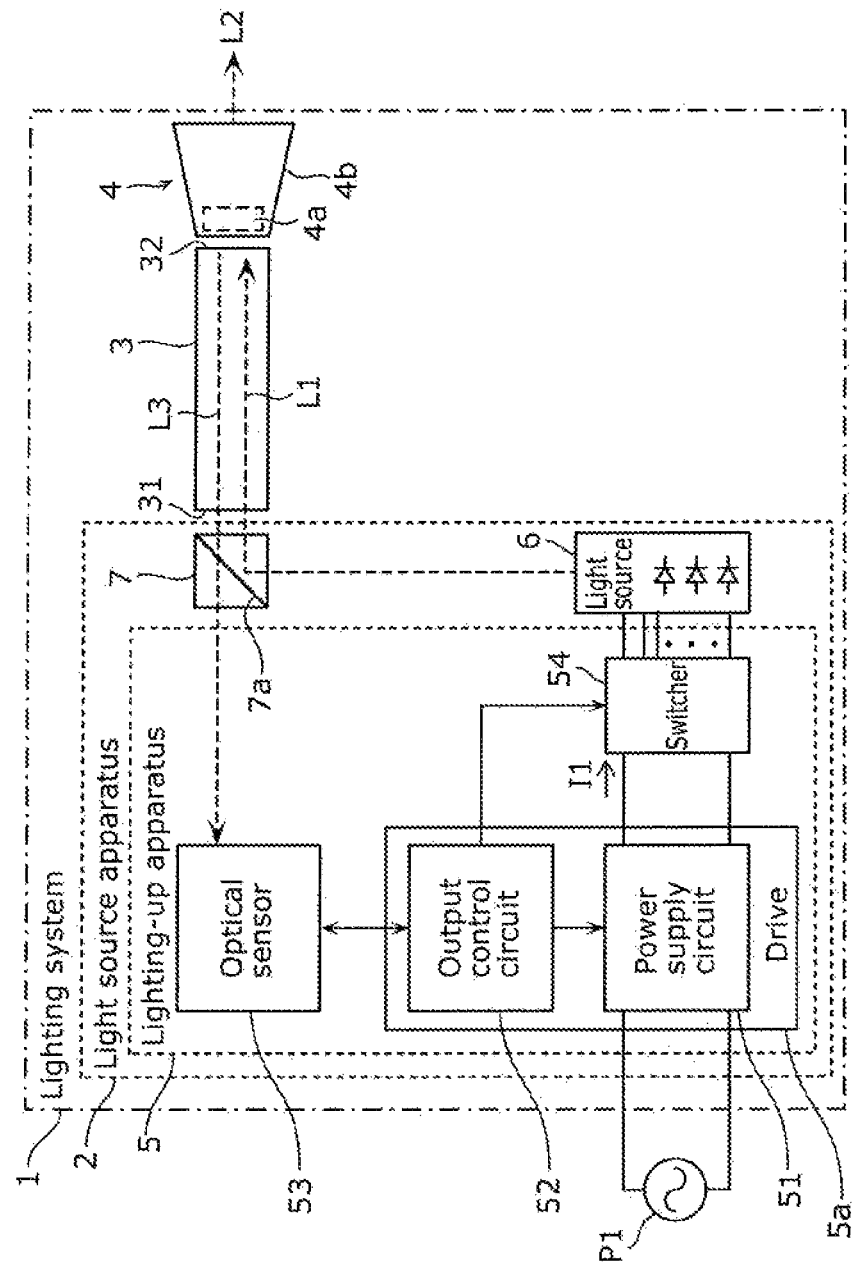
FIG. 1 is a block diagram illustrating a configuration of a lighting system according to an embodiment.
Figure 2:
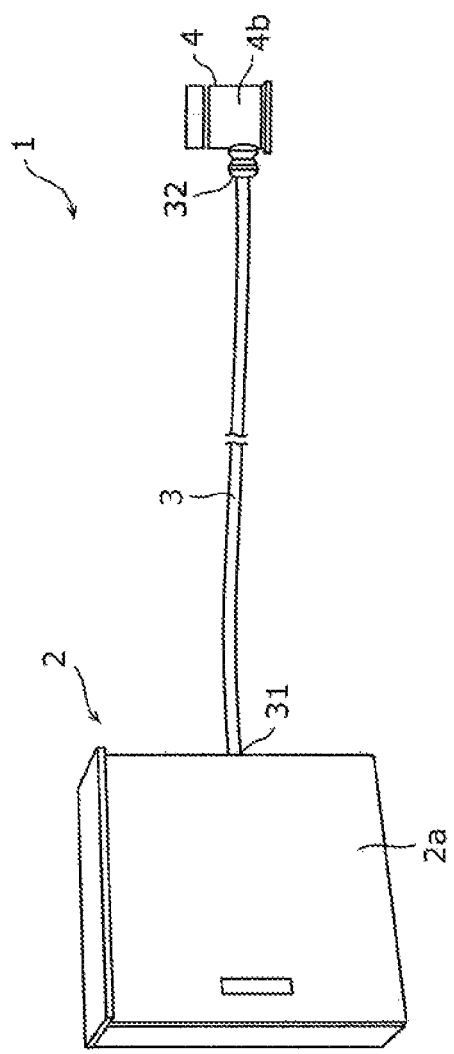
FIG. 2 is an external view illustrating the configuration of the lighting system according to the embodiment.

First, a configuration of the lighting system according to the present embodiment will be described with reference to FIGS. 1 and 2. FIGS. 1 and 2 are respectively a block diagram and an external view, both illustrating a configuration of lighting system 1 according to the present embodiment. In FIG. 1, input power source P1 is also illustrated with lighting system 1. Input power source P1 is a system power source that supplies alternating-current power to lighting system 1. For example, input power source P1 is a commercial AC power supply.

Lighting system 1 is a system for emitting illumination light L2, and includes light source apparatus 2, light guide member 3, and lighting appliance 4 as illustrated in FIGS. 1 and 2. The constituent elements of lighting system 1 may or may not be integrated into a single system. For example, lighting system 1 may be disposed in a single casing, or may be configured as a combination of a plurality of apparatuses that are distributed.

Light source apparatus 2 is an apparatus for emitting first light. As illustrated in FIG. 1, light source apparatus 2 includes lighting-up apparatus 5, light source 6, and optical member 7. In the present embodiment, light source apparatus 2 emits laser light L1 as the first light. As illustrated in FIG. 2, light source apparatus 2 includes casing 2a in which lighting-up apparatus 5, light source 6, and optical member 7 illustrated in FIG. 1 are housed.

Lighting-up apparatus 5 is an apparatus for causing light source 6 to light up by supplying power to light source 6, and includes drive 5a, power supply circuit 51, output control circuit 52, optical sensor 53, and switcher 54.

Drive 5a is a device that controls power supplied to light source 6, and includes power supply circuit 51 and output control circuit 52. Drive 5a also exerts control over switcher 54.

Each constituent element of lighting system 1 will be described hereinafter.

[1-1. Light Source]

Figure 3:
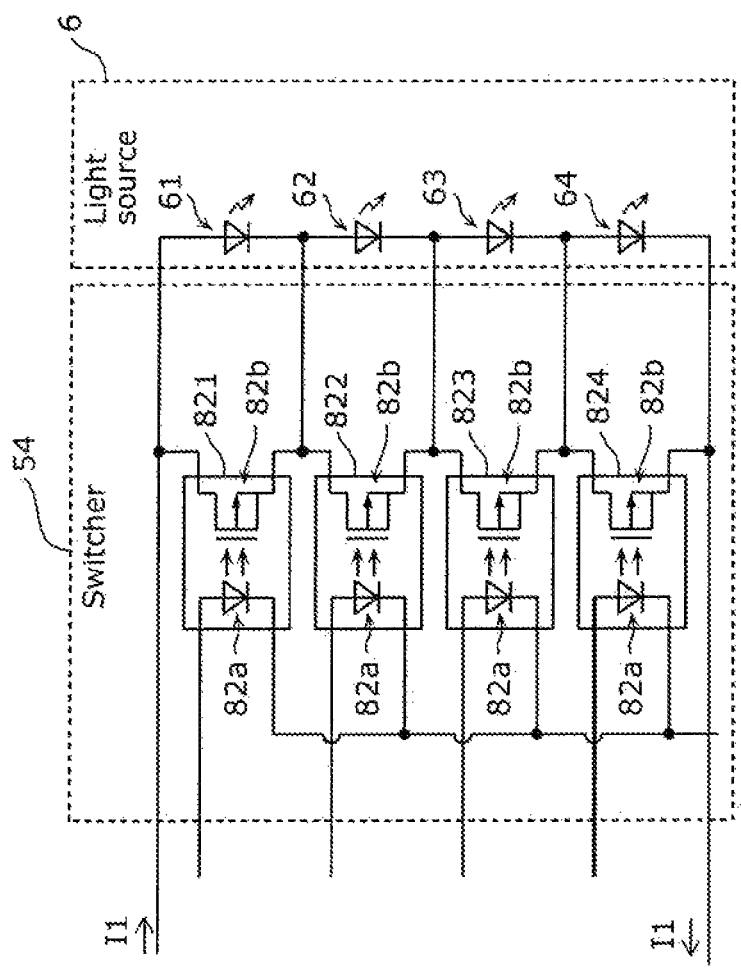
FIG. 3 is a circuit diagram illustrating configurations of a light source and a switcher according to the embodiment.

Light source 6 includes at least one light-emitting device and emits the first light. The configuration of light source 6 according to the present embodiment will be described hereinafter with reference to FIG. 3. FIG. 3 is a circuit diagram illustrating configurations of light source 6 and switcher 54 according to the present embodiment. As illustrated in FIG. 3, light source 6 includes four light-emitting devices 61 to 64 connected in series. Each of light-emitting devices 61 to 64 is not particularly limited to a specific device as long as it serves as a device that emits light in accordance with the supplied power. In the present embodiment, each of light-emitting devices 61 to 64 is a semiconductor laser device that emits blue laser light. Thus, light source 6 emits laser light L1 as the first light. Note that the form of electrical connection of the light-emitting devices included in light source 6 is not limited to series connection, and may be parallel connection, or may be a combination of series connection and parallel connection. The number of light-emitting devices included in light source 6 is not limited to four, and may be one or more. Each light-emitting device included in light source 6 is not limited to a semiconductor laser device, and may be any other solid light-emitting device such as a light-emitting diode (LED) or an organic electron luminescence (EL) device.

[1-2. Switcher]

Switcher 54 is a circuit that establishes a short circuit across each light-emitting device included in light source 6. Switcher 54 includes at least one switch connected respectively in parallel with at least one light-emitting device. The configuration of switcher 54 according to the present embodiment will be described hereinafter with reference to FIG. 3. As illustrated in FIG. 3, switcher 54 in the present embodiment includes a plurality of switches 821 to 824 connected respectively in parallel with the plurality of light-emitting devices 61 to 64. For example, each of switches 821 to 824 is a semiconductor relay (in other words, a solid-state relay) and includes light-emitting diode 82a that serves as a light-emitting device and phototransistor 82b that serves as a light-receiving device. Phototransistors 82b included in respective switches 821 to 824 are connected in series between the output ends of power supply circuit 51. In each of switches 821 to 824, light-emitting diode 82a is connected to output control circuit 52, and phototransistor 82b is connected in parallel with one of light-emitting devices 61 to 64. The anode of light-emitting diode 82a is connected to output control circuit 52, and the cathode of light-emitting diode 82a is electrically connected to the low-voltage output end of power supply circuit 51. Each of switches 821 to 824 turns phototransistor 82b on and off, as a result of output control circuit 52 exerting control over each light-emitting diode 82a. The turn-on and -off of phototransistors 82b may be hereinafter referred to as turn-on and -off of each of switches 821 to 824.

Switches 821 to 824 are in one-to-one correspondence with light-emitting devices 61 to 64 and each are connected in parallel with the corresponding light-emitting device. Switch 821 corresponds to light-emitting device 61, and switch 822 corresponds to light-emitting device 62. Switch 823 corresponds to light-emitting device 63, and switch 824 corresponds to light-emitting device 64.

When phototransistor 82b of each switch is off, driving current I1 flows through the corresponding light-emitting device. On the other hand, when phototransistor 82b is on, driving current I1 does not flow through the corresponding light-emitting device because the corresponding light-emitting device is short-circuited. For example, when phototransistor 82b of switch 821 is off, driving current I1 flows through light-emitting device 61. On the other hand, when phototransistor 82*b* of switch 821 is on, driving current I1 does not flow through light-emitting device 61. The relation between switch 822 and light-emitting device 62, the relation between switch 823 and light-emitting device 63, and the relation between switch 824 and light-emitting device 64 are the same as the aforementioned relation between switch 821 and light-emitting device 61.

[1-3. Optical Member]

Optical member 7 is a member that guides laser light L1 emitted from light source 6 to an optical system. In the present embodiment, the optical system is light guide member 3, and optical member 7 reflects laser light L1 toward first end 31 of light guide member 3. As illustrated in FIG. 1, optical member 7 includes dichroic mirror 7*a*. Optical member 7 also collects laser light L1 and causes the laser light to enter first end 31 of light guide member 3. In addition to dichroic mirror 7*a*, optical member 7 may further include other optical parts such as a mirror and a lens. Monitor light L3 emitted from first end 31 of light guide member 3 passes through dichroic mirror 7*a* of optical member 7 and reaches optical sensor 53.

Dichroic mirror 7*a* has a function of spatially isolating optical paths of laser light L1 and monitor light L3. Dichroic mirror 7*a* transmits or reflects light depending on the wavelength band of the light. In the present embodiment, dichroic mirror 7*a* is configured to reflect laser light L1 and transmit monitor light L3, but it may be configured to transmit laser light L1 and reflect monitor light L3. In this case, the arrangement of optical sensor 53 and light source 6 is appropriately changed depending on the optical path of laser light L1 and the optical path of monitor light L3.

[1-4. Light Guide Member]

Light guide member 3 is one example of the optical system where laser light L1 (i.e., the first light) enters and that applies laser light L1 to wavelength conversion member 4*a*. In the present embodiment, light guide member 3 is an optical fiber that guides laser light L1 and optically connects light source apparatus 2 and lighting appliance 4. Light guide member 3 has a core diameter of, for example, 400 μm. The core diameter of light guide member 3 may be any value less than or equal to 5 mm. Laser light L1 emitted from light source 6 and collected by optical member 7 enters first end 31 of light guide member 3. Laser light L1 is transmitted from first end 31 of light guide member 3 through the inside of light guide member 3 and emitted from second end 32 of light guide member 3.

[1-5. Lighting Appliance]

Lighting appliance 4 is an appliance that emits illumination light L2 in lighting system 1. In the present embodiment, lighting appliance 4 includes appliance body 4*b* and wavelength conversion member 4*a*.

Appliance body 4*b* houses wavelength conversion member 4*a* and emits illumination light L2 emitted from wavelength conversion member 4*a*. For example, appliance body 4*b* is a tubular member having openings at opposite ends, and includes for example a reflection plate that adjusts the luminous intensity distribution of illumination light L2.

Wavelength conversion member 4*a* is a member that converts the first light into second light having a different wavelength from that of the first light. In the present embodiment, wavelength conversion member 4*a* is housed inside appliance body 4*b* and irradiated with laser light L1 (i.e., the first light) emitted from second end 32 of light guide member 3. In the present embodiment, wavelength conversion member 4*a* is a member obtained by mixing a phosphor with a light conductive material. The phosphor is, for example, a yellow phosphor. The yellow phosphor is, for example, $Y_3Al_5O_{12}$ activated by Ce or $Ba_2SiO_4$ activated by Eu. The phosphor is excited by part of blue laser light L1 and emits yellow light as the second light. Wavelength conversion member 4*a* produces white light that is mixed light of the yellow light and the remaining part of blue laser light L1. Lighting appliance 4 further includes at least one optical part, and controls the luminous intensity distribution of the white light produced by wavelength conversion member 4*a* so that most part of the white light is emitted as illumination light L2 from lighting appliance 4 to a lighting space.

Moreover, part of the second light enters second end 32 of light guide member 3 as monitor light L3. Monitor light L3 incident on second end 32 is transmitted through the inside of light guide member 3 and emitted from first end 31 of light guide member 3.

[1-6. Optical Sensor]

Optical sensor 53 is a detector that receives part of the second light as monitor light L3 and outputs a monitor signal corresponding to the intensity of monitor light L3. In the present embodiment, optical sensor 53 detects monitor light L3 emitted from first end 31 of light guide member 3. More specifically, monitor light L3 enters second end 32 of light guide member 3, passes through the inside of light guide member 3, and is emitted from first end 31 of light guide member 3. Monitor light L3 emitted from first end 31 of light guide member 3 passes through dichroic mirror 7*a* of optical member 7 and reaches optical sensor 53. Optical sensor 53 outputs monitor signal Y1 corresponding to the amount of received monitor light L3. Note that an optical filter or the like that attenuates light in wavelength bands other than the wavelength band of monitor light L3 may be further provided in the optical path of monitor light L3 from optical member 7 to optical sensor 53.

Figure 4:
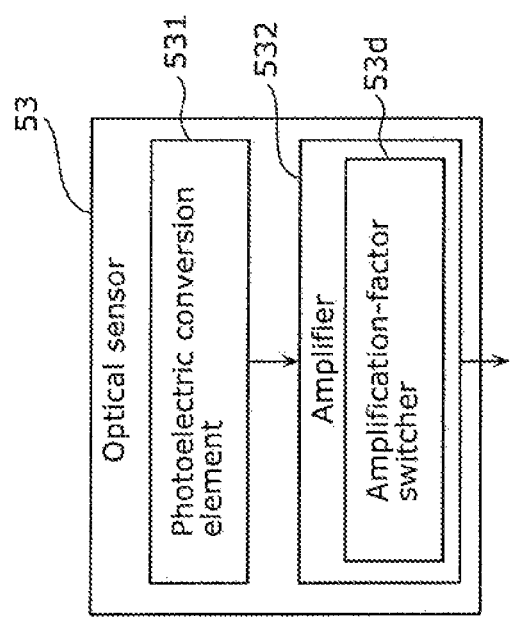
FIG. 4 is a block diagram illustrating a functional configuration of an optical sensor according to the embodiment.

A functional configuration of optical sensor 53 will be described hereinafter with reference to FIG. 4. FIG. 4 is a block diagram illustrating the functional configuration of optical sensor 53 according to the present embodiment. As illustrated in FIG. 4, optical sensor 53 includes photoelectric conversion element 531 and amplifier 532.

Photoelectric conversion element 531 is an element that outputs an electric signal corresponding to the amount of received monitor light L3. Photoelectric conversion element 531 is, for example, a photodetector such as a photodiode, and outputs photoelectric current corresponding to the amount of received monitor light L3.

Amplifier 532 is a circuit that amplifies the electric signal outputted from photoelectric conversion element 531. In the present embodiment, amplifier 532 includes, for example, a current amplifier and resistances and is configured to amplify the photoelectric current outputted from photoelectric conversion element 531, convert the amplified photoelectric current into a voltage, and output the converted voltage as monitor signal Y1. That is, monitor signal Y1 is a voltage signal, and as the amount of monitor light L3 increases, the value of the photoelectric current increases and the voltage value of monitor signal Y1 increases. Optical sensor 53 is electrically connected to output control circuit 52 and outputs monitor signal Y1 to output control circuit 52.

Amplifier 532 includes amplification-factor switcher 53*d*. Amplification-factor switcher 53*d* is a circuit that increases or reduces the amplification factor of the monitor signal. In other words, amplification-factor switcher 53*d* is a circuit that switches the amplification factor of the photoelectric current outputted from photoelectric conversion element 531. Amplification-factor switcher 53d switches the amplification factor in accordance with the signal inputted from output control circuit 52.

Figure 5:
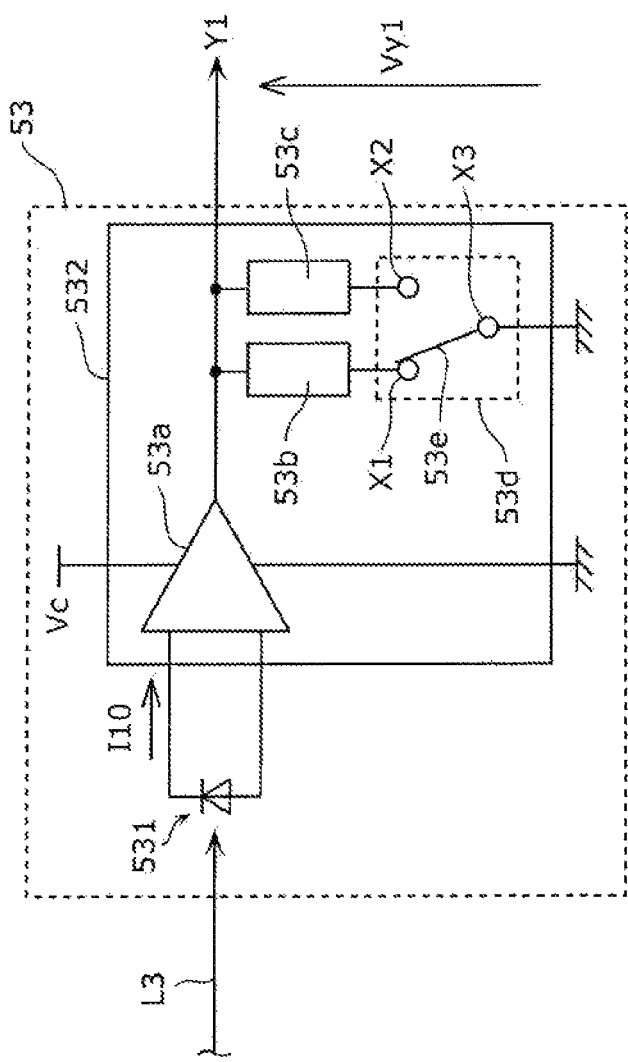
FIG. 5 is a circuit diagram illustrating a configuration of the optical sensor according to the embodiment.

A circuit configuration of optical sensor 53 according to the present embodiment will be described hereinafter with reference to FIG. 5. FIG. 5 is a circuit diagram illustrating the configuration of optical sensor 53 according to the present embodiment. Photoelectric conversion element 531 of optical sensor 53 illustrated in FIG. 5 is a photodiode. Amplifier 532 includes current amplifier 53a, resistance 53b, resistance 53c, and amplification-factor switcher 53d.

Current amplifier 53a amplifies photoelectric current I10 of photoelectric conversion element 531 and outputs the amplified current (i.e., output current), using control voltage Vc as a driving voltage. One output end of current amplifier 53a is electrically connected to one end of each of resistances 53b and 53c. The other ends of resistances 53b and 54c are electrically connected to amplification-factor switcher 53d.

Amplification-factor switcher 53d includes switch 53e. Switch 53e includes two fixed contacts X1 and X2 and movable contact X3 and selectively connects movable contact X3 to either fixed contact X1 or X2. Fixed contact X1 is electrically connected to the other end of resistance 53b, and fixed contact X2 is electrically connected to the other end of resistance 53c. Movable contact X3 is electrically connected to a circuit ground. Thus, by switching a connection destination of movable contact X3 to either fixed contact X1 or X2, switch 53e electrically connects the other end of either resistance 53b or 53c to the circuit ground. That is, amplification-factor switcher 53d makes resistances 53b and 53c switchable and selects either resistance 53b or 53c as a resistance (gain resistance) that is connected between the output end of current amplifier 53a and the circuit ground. Then, output current of current amplifier 53a flows through the gain resistance (resistance 53b or 53c) and switch 53e. If a voltage drop in switch 53e caused by the output current is assumed to be approximately zero, voltage value Vy1 occurs between the output end of current amplifier 53a and the circuit ground due to a voltage drop in the gain resistance (resistance 53b or 53c), and monitor signal Y1 is output from the output end of current amplifier 53a.

In the present embodiment, resistance 53b has a resistance value greater than that of resistance 53c. Thus, voltage value Vy1 with respect to fixed photoelectric current I10 in the case of using resistance 53b as the gain resistance is greater than that in the case of using resistance 53c as the gain resistance. That is, amplification-factor switcher 53d is capable of switching the amplification factor used in amplifier 532 by switching the connection destination of movable contact X3 to either fixed contact X1 or X2. Specifically, the amplification factor in the case of using resistance 53b as the gain resistance is higher than that in the case of using resistance 53c as the gain resistance.

Figure 6:
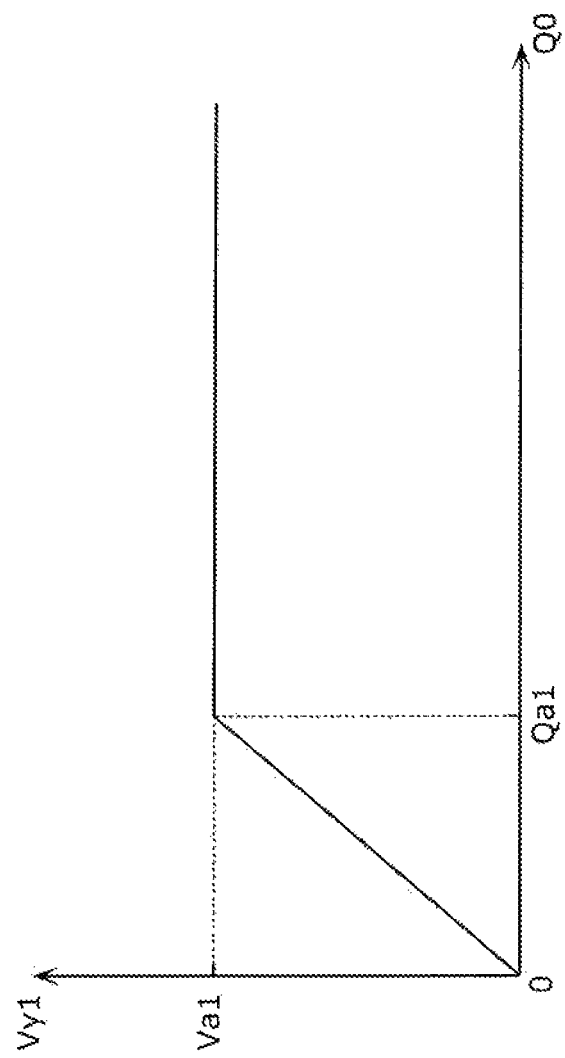
FIG. 6 is a graph illustrating output characteristics of the optical sensor according to the embodiment.

Here, output characteristics of optical sensor 53 will be described with reference to FIG. 6. FIG. 6 is a graph illustrating the output characteristics of optical sensor 53 according to the present embodiment. The horizontal axis in FIG. 6 indicates light amount Q0 of monitor light L3, and the vertical axis in FIG. 6 indicates voltage value Vy1 of monitor signal Y1. As illustrated in FIG. 6, voltage value Vy1 increases linearly from zero as light amount Q0 increases from zero. Then, when light amount Q0 exceeds saturation light amount Qa1 (first value), voltage value Vy1 becomes constant at saturation voltage value (saturation value) Va1 (second value). That is, amplifier 532 functions as an analog amplifier, and when light amount Q0 falls within the range of values greater than or equal to zero and less than or equal to Qa1, optical sensor 53 operates in a linear region in which voltage value Vy1 is proportional to light amount Q0, and voltage value Vy1 increases as light amount Q0 increases. However, when light amount Q0 exceeds saturation light amount Qa1, optical sensor 53 operates in a saturation region in which the output of optical sensor 53 becomes saturated, and voltage value Vy1 is constant at saturation voltage value Va1. Saturation light amount Qa1 is, for example, approximately 25% of a maximum value of light amount Q0 (i.e., light amount Q0 of monitor light L3 when light source 6 is in rated conditions of lighting). In this way, by causing optical sensor 53 to operate not only in the linear region but also in the saturation region, it is possible to widen a dynamic range of light amount Q0 that can be measured by optical sensor 53. Ordinarily, output control circuit 52 controls driving current I1 at a rated current value, and supplies rated driving current I1 to light source 6. Light amount Q0 obtained from rated driving current I1 is greater than saturation light amount Qa1, and voltage value Vy1 takes on saturation voltage value Va1 during normal operation. In the case where saturation voltage value Va1 increases slightly (to an extent that is considerably smaller than the amount of increase in the linear region) with an increase in light amount Q0, a minimum value of saturation voltage value Va1 is assumed to be the second value.

The output characteristics of optical sensor 53 illustrated in FIG. 6 correspond to output characteristics in the case of using resistance 53b of optical sensor 53 as the gain resistance. That is, when resistance 53b of optical sensor 53 is used as the gain resistance (i.e., the amplification factor is maximized) and when light amount Q0 of monitor light L3 exceeds saturation light amount Qa1, voltage value Vy1 of monitor signal Y1 takes on saturation voltage value Va1.

The switching of amplification-factor switcher 53d is controlled by output control circuit 52. Ordinarily, output control circuit 52 controls amplification-factor switcher 53d to select resistance 53b as the gain resistance (i.e., maximize the amplification factor). Then, output control circuit 52 controls amplification-factor switcher 53d to switch the gain resistance from resistance 53b to resistance 53c at predetermined timing. That is, amplification-factor switcher 53d switches the amplification factor of amplifier 532 at predetermined timing. The resistance value of resistance 53c is defined such that optical sensor 53 operates in the linear region at the maximum value of light amount Q0 (i.e., light amount Q0 when light source 6 is in rated conditions of lighting). Therefore, using resistance 53c as the gain resistance allows optical sensor 53 to output voltage value Vy1 of monitor signal Y1 that is in one-to-one correspondence with light amount Q0. Accordingly, it is possible to accurately measure the amount of monitor light L3 and to accurately determine the condition of light source 6.

[1-7. Power Supply Circuit]

Power supply circuit 51 is a circuit that supplies power to light source 6. Power supply circuit 51 converts and outputs a voltage of power outputted from input power source P1. In the present embodiment, the power supply circuit is a switching power supply circuit that converts AC power outputted from input power source P1 into DC power. Power supply circuit 51 may also be a switching power supply circuit having a power-factor improvement function. For example, power supply circuit 51 includes an AC/DC converter circuit and a DC/DC converter circuit. The AC/DC converter circuit is, for example, a step-up chopper circuit or a step-up and -down chopper circuit that has a power-factor improvement function. The AC/DC converter circuit may be an isolated flyback converter circuit. The DC/DC converter circuit is, for example, a chopper circuit subjected to constant current control. In the case where the voltage of light source 6 is lower than the output voltage of the AC/DC converter circuit, a step-down circuit such as a step-down chopper circuit is used as the DC/DC converter circuit. On the other hand, in the case where the voltage of light source 6 is higher than the output voltage of the AC/DC converter circuit, a step-up circuit such as a step-up chopper circuit is used as the DC/DC converter circuit. In the case where the voltage of light source 6 is either higher or lower than the output voltage of the AC/DC converter circuit, a step-up and -down circuit such as a step-up and -down chopper circuit is used as the DC/DC converter circuit.

Alternatively, power supply circuit 51 may be a single-stage converter (SS converter). The SS converter is a converter of a single conversion system (one voltage conversion) that has a power-factor improvement function and an AC/DC converter function.

[1-8. Output Control Circuit]

Output control circuit 52 is a circuit that controls light source 6 and optical sensor 53. In the present embodiment, output control circuit 52 controls current supplied to each light-emitting device of light source 6 by controlling power supply circuit 51 and switcher 54. More specifically, output control circuit 52 adjusts driving current I1 by controlling power supply circuit 51. That is, drive 5a has a light control function of adjusting the amount of laser light L1 by making driving current I1 variable. Output control circuit 52 also establishes a short circuit across each light-emitting device of light source 6 by controlling switcher 54.

Moreover, output control circuit 52 performs a light source inspection process and an optical system inspection process in accordance with monitor signal Y1 received from optical sensor 53, using a time division method, the light source inspection process being a process of inspecting the condition of light source 6, and the optical system inspection process being a process of inspecting the conditions of the optical system and wavelength conversion member 4a. The details of the light source inspection process and the optical system inspection process will be described later.

Output control circuit 52 includes, for example, a control integrated circuit (IC) and a computer system. The computer system includes, as its principal hardware configuration, a processor that operates in accordance with programs. The type of the processor is not limited as long as the processor is capable of implementing each function of output control circuit 52 by executing programs. The processor is configured as at least one electronic circuit including a semiconductor integrated circuit (IC) or large scale integration (LSI). Here, an integrated circuit included in an electronic circuit is referred to as an IC or LSI, but it is named differently depending on the degree of integration and may also be referred to as system LSI, very large scale integration (VLSI), or ultra large scale integration (ULSI). A field programmable gate array (FPGA) programmed after manufacture of LSI or a reconfigurabe logical device capable of reconfiguring the bonding relationship inside LSI or capable of setting up circuit sections inside LSI may also be used for the same purpose as the aforementioned integrated circuit. A plurality of electronic circuits may be integrated into a single chip, or may be provided on a plurality of chips. A plurality of chips may be integrated into a single device, or may be provided in a plurality of devices. Programs are stored in a non-transitory recording medium such as a computer-readable ROM, an optical disk, or a hard disk drive. Those programs may be stored in advance in the non-transitory recording medium, or may be supplied to the non-transitory recording medium via a wide-area communication network such as the Internet. The computer system implements each function of output control circuit 52 according to the present embodiment by causing the processor to execute programs.

[2. Control Method]

Figure 7:
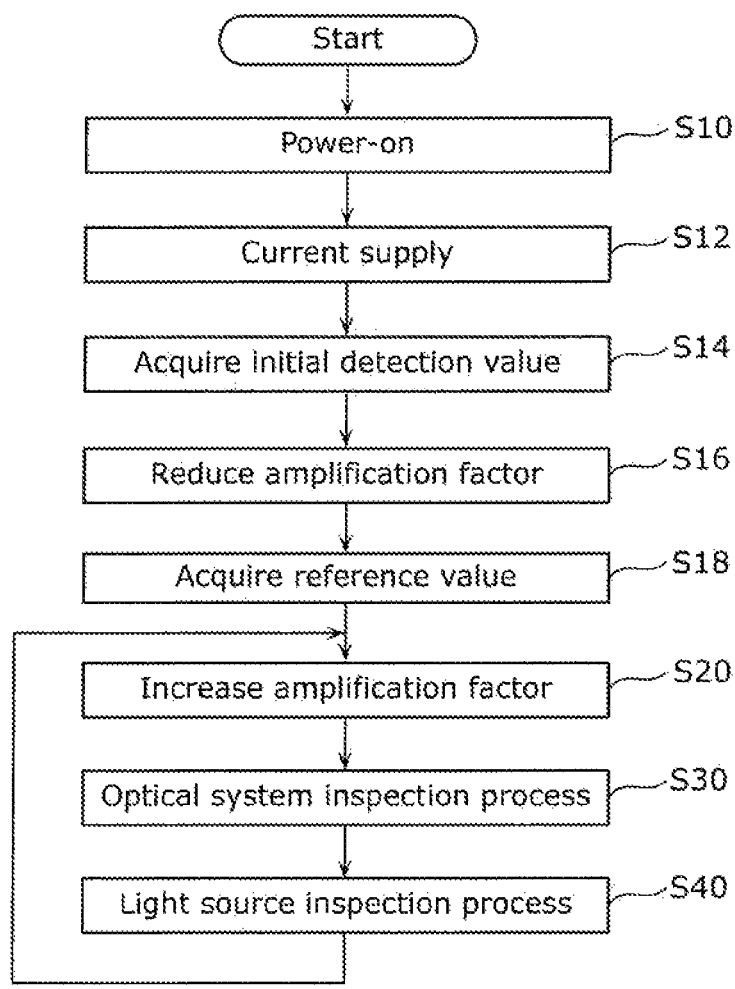
FIG. 7 is a flowchart illustrating a procedure for a method of controlling the lighting system according to the embodiment.

Next, a method of controlling lighting system 1 according to the present embodiment will be described with reference to FIG. 7. FIG. 7 is a flowchart illustrating a procedure for the method of controlling lighting system 1 according to the present embodiment.

As illustrated in FIG. 7, first, lighting system 1 is powered on (S10). This enables input power source P1 to supply power to lighting system 1 (see FIG. 1).

Then, output control circuit 52 supplies driving current I1 to light source 6 by controlling power supply circuit 51 (S12). Following this, each light-emitting device of light source 6 outputs laser light L1. Laser light L1 is applied to wavelength conversion member 4a via optical member 7 and light guide member 3, and illumination light L2 and monitor light L3 are emitted from wavelength conversion member 4a.

Monitor light L3 emitted from wavelength conversion member 4a enters optical sensor 53 via light guide member 3 and optical member 7. Optical sensor 53 measures monitor light L3 and outputs monitor signal Y1 to output control circuit 52. Output control circuit 52 acquires monitor signal Y1 as an initial detection value (S14). Here, amplifier 532 of optical sensor 53 uses resistance 53b as the gain resistance. Thus, when driving current I1 takes on a rated current value, the initial detection value takes on saturation voltage value Va1 illustrated in FIG. 6.

Referring back to FIG. 7, output control circuit 52 reduces the amplification factor used in amplifier 532 of optical sensor 53 by controlling amplification-factor switcher 53d of optical sensor 53 (S16). That is, resistance 53c is used as the gain resistance by controlling amplification-factor switcher 53d illustrated in FIG. 5. In this way, with amplifier 532 using a reduced amplification factor, optical sensor 53 measures monitor light L3 and outputs monitor signal Y1 to output control circuit 52. Output control circuit 52 acquires monitor signal Y1 as a reference value (S18). Here, the gain resistance of amplifier 532 is set such that monitor signal Y1 takes on a value smaller than saturation voltage value Va1. In this way, it is possible to measure monitor signal Y1 that is in one-to-one correspondence with the amount of monitor light L3.

Then, referring back to FIG. 7, output control circuit 52 increases the amplification factor used in amplifier 532 of optical sensor 53 by controlling amplification-factor switcher 53d of optical sensor 53 (S20). That is, resistance 53b is used as the gain resistance by controlling amplification-factor switcher 53d illustrated in FIG. 5.

Figure 8:
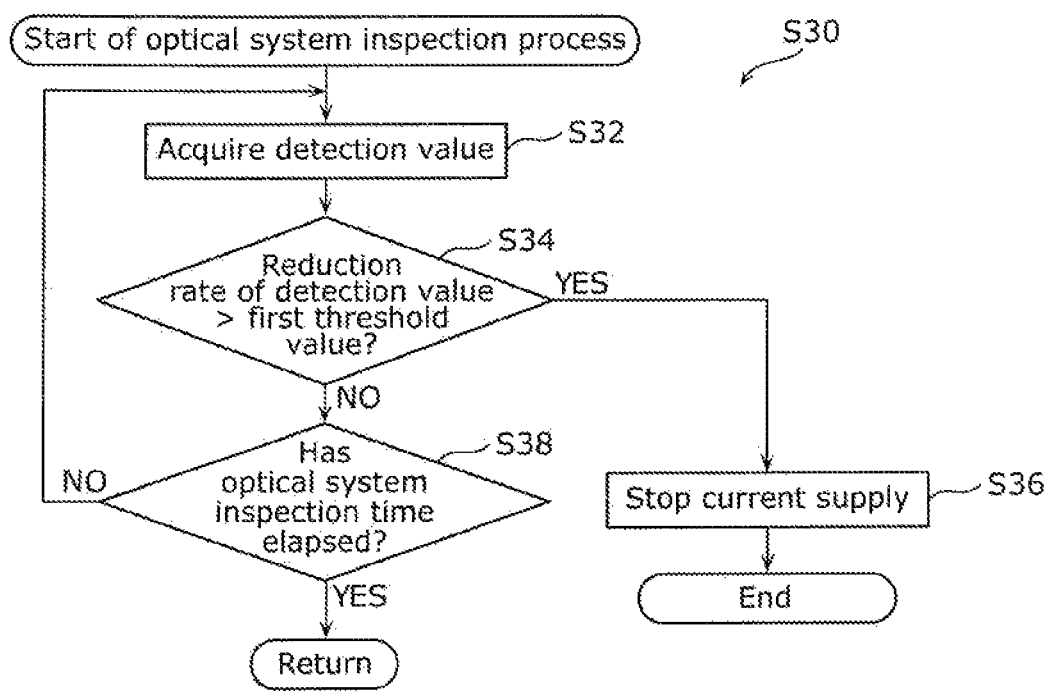
FIG. 8 is a flowchart illustrating a procedure of an optical system inspection process according to the embodiment.

Then, referring back to FIG. 7, output control circuit 52 performs the optical system inspection process (S30). Here, the optical system inspection process will be described with reference to FIG. 8. FIG. 8 is a flowchart illustrating a procedure of the optical system inspection process according to the present embodiment.

In the optical system inspection process, output control circuit 52 acquires a detection value as illustrated in FIG. 8 (S32). Specifically, optical sensor 53 measures monitor light L3 and outputs monitor signal Y1 to output control circuit 52. Output control circuit 52 acquires monitor signal Y1 as a detection value.

Then, output control circuit 52 determines whether the rate of reduction of the detection value acquired in step S32 is greater than a first threshold value (S34). Here, the detection value acquired in step S32 and the immediately preceding detection value (or the initial detection value detected in step S14) are compared to determine whether the rate of reduction of the detection value is greater than the first threshold value. The first threshold value is determined based on the rate of reduction of the detection value in the case where an anomaly has occurred in the optical system or wavelength conversion member 4a. The first threshold value is, for example, approximately 50%.

If output control circuit 52 has determined in step S34 that the rate of reduction of the detection value is greater than the first threshold value (Yes in S34), output control circuit 52 determines that an anomaly has occurred in the optical system or wavelength conversion member 4a and stops the supply of current to light source 6 (S36).

On the other hand, if output control circuit 52 has determined in step S34 that the rate of reduction of the detection value is less than or equal to the first threshold value (No in S34), output control circuit 52 determines whether an optical system inspection time has elapsed since the start time of the optical system inspection process (i.e., since the start time of step S32) (S38). Here, the optical system inspection time refers to a minimum value of the duration of the optical system inspection process, and may be set to, for example, a value approximately greater than or equal to 50 msec and less than or equal to 100 msec.

If the output control circuit has determined in step S38 that the optical system inspection time has not elapsed yet (No in S38), the procedure returns to step S32 to continue the optical system inspection process. On the other hand, if the output control circuit has determined in step S38 that the optical system inspection time has elapsed (Yes in S38), the procedure proceeds to the light source inspection process (S40) illustrated in FIG. 7.

Figure 9:
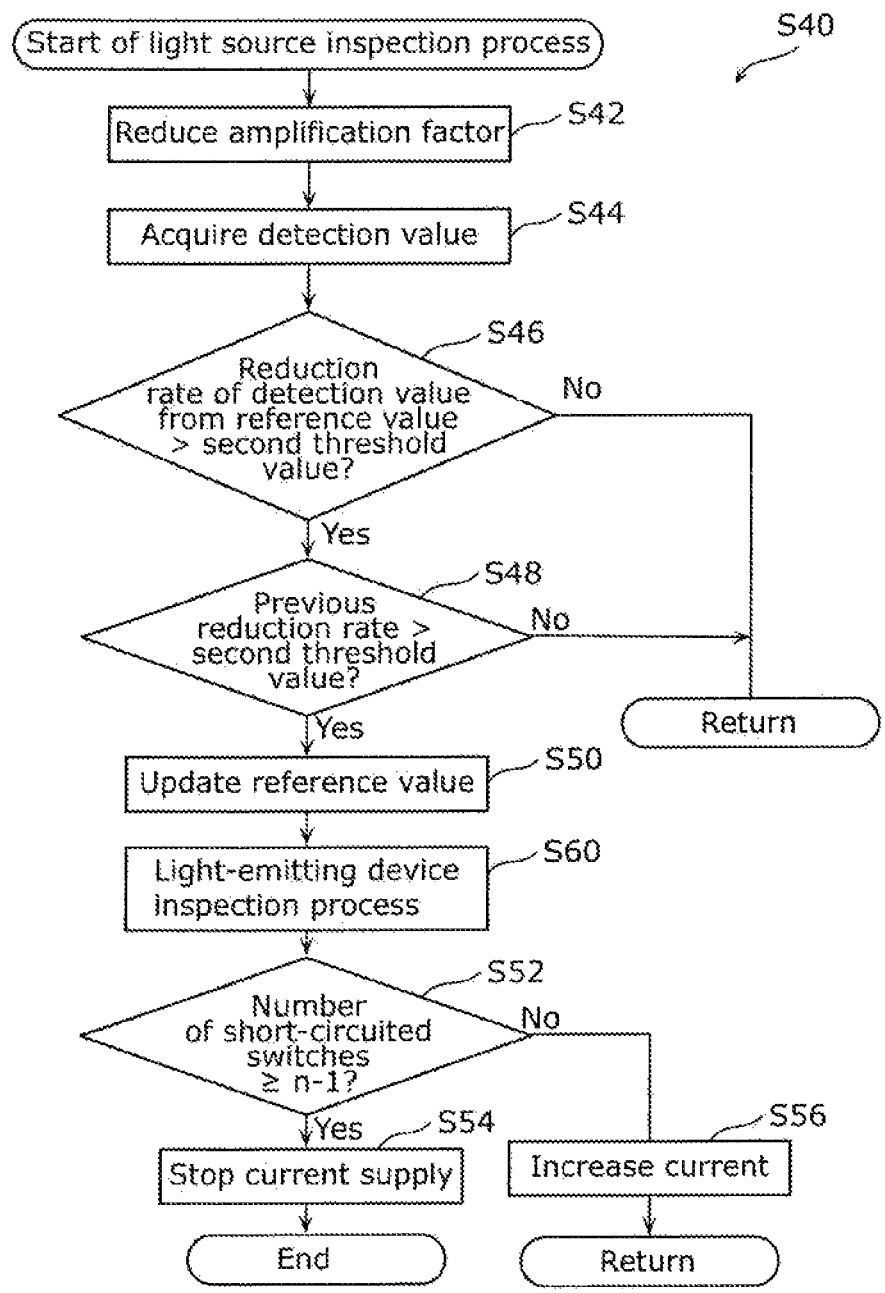
FIG. 9 is a flowchart illustrating a procedure of a light source inspection process according to the embodiment.

The light source inspection process will be described hereinafter with reference to FIG. 9. FIG. 9 is a flowchart illustrating a procedure of the light source inspection process according to the present embodiment.

In the light source inspection process, output control circuit 52 reduces the amplification factor used in amplifier 532 of optical sensor 53 as in step S16 illustrated in FIG. 7 (S42), and acquires a detection value as in step S32 illustrated in FIG. 8 (S44).

Then, output control circuit 52 determines whether the rate of reduction of the detection value acquired in step S44 illustrated in FIG. 9 from the reference value is greater than a second threshold value (S46). Here, the second threshold value refers to a value that is set as the rate of reduction of the detection value to approximately a lower limit value of a range that is assumed to represent the probability of occurrence of an anomaly in light source 6. For example, the second threshold value is set to approximately 10% of the reference value. That is, if the rate of reduction of the detection value from the reference value is greater than the second threshold value, there is a high probability of occurrence of an anomaly in light source 6.

If output control circuit 52 has determined in step S46 that the rate of reduction of the detection value from the reference value is not greater than the second threshold value (No in S46), output control circuit 52 finishes the light source inspection process and returns to the step of increasing the amplification factor (S20 in FIG. 7).

On the other hand, if output control circuit 52 has determined in step S46 that the rate of reduction of the detection value from the reference value is greater than the second threshold value (Yes in S46), the output control circuit determines whether the rate of reduction in the previous light source inspection process is also greater than the second threshold value (S48).

In step S48, if output control circuit 52 has determined in the previous light source inspection process that the rate of reduction is not greater than the second threshold value (No in S48), output control circuit 52 finishes the light source inspection process and returns to the step of increasing the amplification factor (S20 in FIG. 7).

Figure 10:
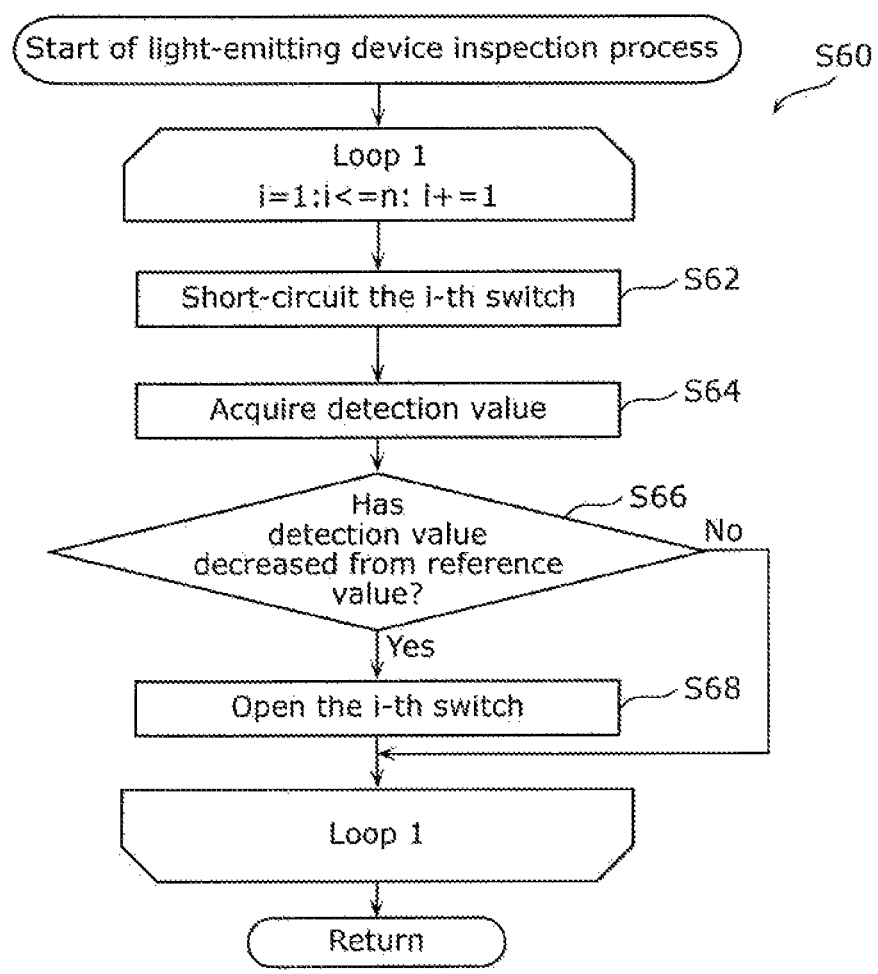
FIG. 10 is a flowchart illustrating a procedure of a light-emitting device inspection process according to the embodiment.

On the other hand, in step S48, if output control circuit 52 has also determined in the previous light source inspection process that the rate of reduction is greater than the second threshold value (Yes in S48), output control circuit 52 updates the reference value with the immediately preceding detection value acquired in step S44 (S50) and proceeds to the light-emitting device inspection process (S60). Here, the light-emitting device inspection process will be described with reference to FIG. 10. FIG. 10 is a flowchart illustrating a procedure of the light-emitting device inspection process according to the present embodiment.

In the light-emitting device inspection process as illustrated in FIG. 10, in the case where light source 6 includes n light-emitting devices (where n is an integer greater than or equal to one), inspection is conducted one by one in sequence from the first light-emitting device to the n-th light-emitting device (Loop 1 in FIG. 10). In the present embodiment, first to fourth light emitting devices 61 to 64 are inspected in sequence. Specifically, in the inspection process, output control circuit 52 short-circuits the i-th switch that is connected in parallel with the i-th light-emitting device (where i is an integer greater than or equal to one and less than or equal to n) (S62). For example, in the case where i=1, switch 821 connected in parallel with first light-emitting device 61 is short-circuited. Thus, current does not flows through the first light-emitting device, whereas current flows through first switch 821. Accordingly, in the case where first light-emitting device 61 is operating normally, the amounts of laser light L1 emitted from light source 6 and monitor light L3 will decrease because first switch 821 is short-circuited.

On the other hand, if first light-emitting device 61 has an anomaly and does not emit laser light, the amounts of laser light L1 and monitor light L3 will not decrease even if first switch 821 is short-circuited. Accordingly, by short-circuiting first switch 821 and measuring the amount of monitor light L3, it is possible to determine the presence or absence of an anomaly in first light-emitting device 61. Similarly in the case where i is a value other than one, the presence or absence of an anomaly in the i-th light-emitting device can be determined.

Following step S62, output control circuit 52 acquires a detection value as in step S32 illustrated in FIG. 8 (S64). Then, output control circuit 52 determines whether the detection value has decreased from the reference value (S66). Specifically, if the amount of reduction of the detection value from the reference value is greater than a third threshold value, output control circuit 52 determines that the detection value has decreased from the reference value. The third threshold value is set to, for example, a value approximately greater than or equal to 1% of the reference value and less than or equal to 5% of the reference value.

If output control circuit 52 has determined in step S66 that the detection value decreased from the reference value (Yes in S66), output control circuit 52 determines the i-th light-emitting device as normal, opens the i-th switch (S68), and inspects the (i+1)-th light-emitting device. On the other hand, if output control circuit 52 has determined in step S66 that the detection value did not decrease from the reference value (No in S66), output control circuit 52 determines the i-th light-emitting device as abnormal, keeps the i-th switch short-circuited, and inspects the (i+1)-th light-emitting device.

After having inspected each light-emitting device as described above and completed the inspection of all of the light-emitting devices, output control circuit 52 determines whether the number of short-circuited switches is greater than or equal to n−1, as illustrated in FIG. 9 (S52). In other words, the output control circuit determines whether there are two or more light-emitting devices that are not short-circuited. If having determined that the number of short-circuited switches is greater than or equal to n−1, output control circuit 52 stops the supply of current to light source 6 (S54) and finishes the operation of lighting system 1. On the other hand, if having determined that the number of short-circuited switches is less than n−1, output control circuit 52 increases the current supplied to light source 6 in order to compensate for the amount of reduction in the amount of monitor light L3 (S56), and performs the optical system inspection process illustrated in FIG. 7 (S30).

As described above, in the method of controlling lighting system 1 according to the present embodiment, output control circuit 52 performs the optical system inspection process of inspecting the conditions of the optical system and wavelength conversion member 4a and the light source inspection process of inspecting the condition of light source 6 in accordance with monitor signal Y1, using a time division method. Accordingly, it is possible to individually detect anomalies in the optical system and wavelength conversion member 4a and an anomaly in each light-emitting device of light source 6. Moreover, lighting system 1 according to the present embodiment can have a simplified configuration because only one optical sensor 53 is used to inspect the optical system and wavelength conversion member 4a and to inspect light source 6.

In the present embodiment, output control circuit 52 alternately repeats the light source inspection process and the optical system inspection process. Thus, it is possible to detect anomalies in the light source and the optical system without delay.

[3. Example Operation]

Figure 11:
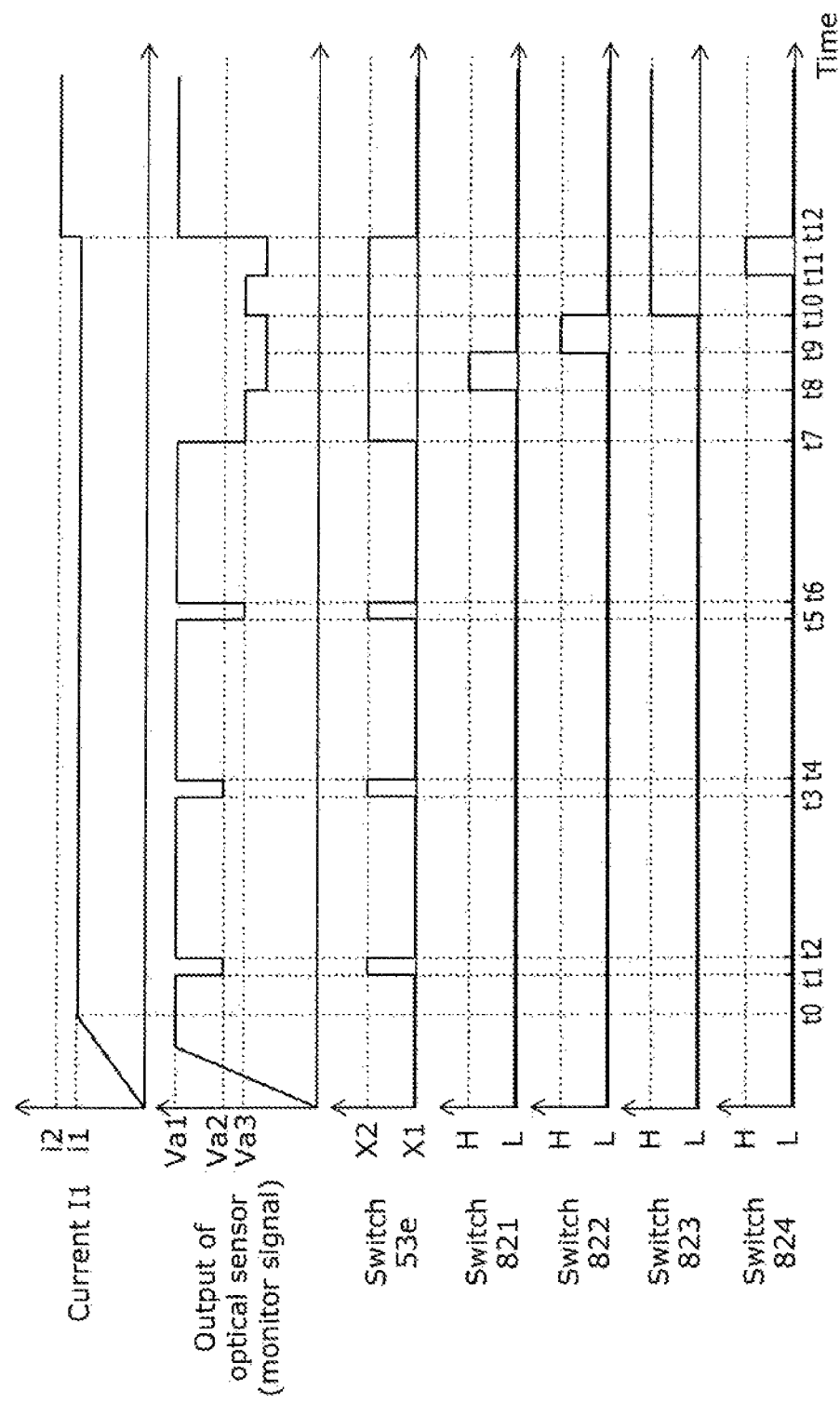
FIG. 11 is a timing chart illustrating an example operation of the lighting system according to the embodiment.

Next, an example operation of lighting system 1 according to the present embodiment will be described with reference to FIG. 11. FIG. 11 is a timing chart illustrating an example operation of lighting system 1 according to the present embodiment. FIG. 11 is an illustration of the relationship between time and each of driving current I1 supplied to light source 6, the output of the optical sensor (monitor signal Y1), the state of switch 53e of amplification-factor switcher 53d, and the level of the voltage supplied to switches 821 to 824 of switcher 54.

As illustrated in FIG. 11, lighting system 1 is first powered on, and output control circuit 52 starts to supply driving current I1 to light source 6. Specifically, the amount of current is increased so that driving current I1 becomes equal to i1 at time t0. At this time, optical sensor 53 uses resistance 53b as the gain resistance, and the amplification factor is high. Thus, monitor signal Y1 outputted from optical sensor 53 becomes saturated and takes on saturation voltage value Va1 before time t0.

After driving current I1 supplied to light source 6 has become equal to i1 at time t0, output control circuit 52 acquires monitor signal Y1 as an initial detection value. In the example operation illustrated in FIG. 11, the initial detection value takes on saturation voltage value Va1.

Then, at time t1, output control circuit 52 reduces the amplification factor used in amplifier 532 of optical sensor 53 by controlling switch 53e in amplification-factor switcher 53d of optical sensor 53. Specifically, output control circuit 52 switches the gain resistance from resistance 53b to resistance 53c by connecting movable contact X3 of switch 53e to fixed contact X2 (see FIG. 5). In this way, with amplifier 532 using a reduced amplification factor, output control circuit 52 acquires monitor signal Y1 as a reference value. In the example operation illustrated in FIG. 11, the reference value takes on Va2, which is smaller than saturation voltage value Va1. After having acquired the reference value, output control circuit 52 increases the amplification factor in optical sensor 53 at time t2.

Then, output control circuit 52 performs the optical system inspection process described with reference to FIG. 8. Specifically, the output control circuit acquires a detection value and determines whether the rate of reduction of the detection value is greater than the first threshold value. In the example operation illustrated in FIG. 11, the rate of reduction of the detection value from the initial detection value does not exceed the first threshold value before the optical system inspection time has elapsed. Thus, at time t3, output control circuit 52 finishes the optical system inspection process and performs the light source inspection process described with reference to FIGS. 9 and 10. Specifically, as in the operation from time t1 to time t2, output control circuit 52 acquires monitor signal Y1 outputted from optical sensor 53 as a detection value, with optical sensor 53 using a reduced amplification factor. In the example operation illustrated in FIG. 11, the rate of reduction of the detection value (Va2) acquired at time t3 from the reference value (Va2) acquired at time t1 is less than or equal to the second threshold value. Thus, at time t4, the output control circuit finishes the light source inspection process and increases the amplification factor in optical sensor 53.

Then, output control circuit 52 performs the optical system inspection process, as in the period from time t2 to time t3. In the example operation illustrated in FIG. 11, the rate of reduction of the detection value from the initial detection value does not exceed the first threshold value before the optical system inspection time has elapsed. Thus, at time t5, output control circuit 52 finishes the optical system inspection process and performs the light source inspection process. Specifically, as in the operation from time t1 to time t2, output control circuit 52 acquires monitor signal Y1 outputted from optical sensor 53 as a detection value, with optical sensor 53 using a reduced amplification factor. In the example operation illustrated in FIG. 11, the rate of reduction of the detection value (Va3) acquired at time t5 from the reference value (Va2) acquired at time t1 is greater than the second threshold value, but in the previous light source inspection process (i.e., at time t3), the rate of reduction of the detection value from the reference value was less than or equal to the second threshold value. Thus, at time t6, output control circuit 52 finishes the light source inspection process and increases the amplification factor in optical sensor 53.

Then, output control circuit 52 performs the optical system inspection process as in the period from time t2 to time t3. In the example operation illustrated in FIG. 11, the rate of reduction of the detection value from the initial detection value does not exceed the first threshold value before the optical system inspection time has elapsed. Thus, at time t7, output control circuit 52 finishes the optical system inspection process and performs the light source inspection process. Specifically, output control circuit 52 acquires monitor signal Y1 outputted from optical sensor 53 as a detection value, with optical sensor 53 using a reduced amplification factor. In the example operation illustrated in FIG. 11, the rate of reduction of the detection value (Va3) acquired at time t7 from the reference value (Va2) acquired at time t1 is greater than the second threshold value, and in the previous light source inspection process (i.e., at time t5) as well, the rate of reduction of the detection value from the reference value was greater than the second threshold value. Thus, output control circuit 52 updates the reference value with the detection value (Va3) acquired at time t7 and performs the light-emitting device inspection process.

In the light-emitting device inspection process, first, the output control circuit waits until time t8 in order to stabilize monitor signal Y1 outputted from optical sensor 53. In the present embodiment, output control circuit 52 waits for approximately 10 msec, for example.

Then, in the period from time t8 to time t9, output control circuit 52 supplies a high-level voltage to first switch 821 so as to short-circuit switch 821 and acquire a detection value. In the example operation illustrated in FIG. 11, the detection value is less than Va3, i.e., it has decreased from the reference value (Va3). Thus, the output control circuit determines that there is no anomaly in first light-emitting device 61, and opens first switch 821.

Then, in the period from time t9 to time t10, output control circuit 52 supplies a high-level voltage to second switch 822 so as to short-circuit switch 822 and acquire a detection value. In the example operation illustrated in FIG. 11, the detection value is less than Va3, i.e., it has decreased from the reference value (Va3). Thus, the output control circuit determines that there is no anomaly in second light-emitting device 62, and opens second switch 822.

Then, in the period from time t10 to time t11, output control circuit 52 supplies a high-level voltage to third switch 823 so as to short-circuit switch 823 and acquire a detection value. In the example operation illustrated in FIG. 11, the detection value takes on Va3, i.e., it has not decreased from the reference value (Va3). Thus, the output control circuit determines that there is an anomaly in third light-emitting device 63, and keeps third switch 823 short-circuited.

Then, in the period from time t11 to time t12, output control circuit 52 supplies a high-level voltage to fourth switch 824 so as to short-circuit switch 824 and acquire a detection value. In the example operation illustrated in FIG. 11, the detection value is less than Va3, i.e., it has decreased from the reference value (Va3). Thus, the output control circuit determines that there is no anomaly in fourth light-emitting device 64, and opens fourth switch 824.

At time t12, output control circuit 52 finishes the light-emitting device inspection process and confirms the number of short-circuited switches. In the example operation illustrated in FIG. 11, only one switch 823 is short-circuited. Thus, output control circuit 52 increases driving current I1 supplied to light source 6 from i1 to i2 and continues the operation.

Hereinafter, the optical system inspection process and the light source inspection process are alternately repeated as in the operations described above.

As described above, lighting system 1 according to the present embodiment is capable of individually detecting anomalies in the optical system and the wavelength conversion member and an anomaly in each light-emitting device of light source 6.

[4. Effects and Other Features]

As described above, lighting system 1 according to the present embodiment includes light source 6 that includes at least one light-emitting device and emits the first light, wavelength conversion member 4a that converts part of the first light into the second light having a different wavelength from that of the first light, the optical system where the first light enters and that applies the first light to wavelength conversion member 4a, optical sensor 53 that receives part of the second light as monitor light L3 and outputs monitor signal Y1 corresponding to the intensity of monitor light L3, and output control circuit 52 that controls light source 6 and optical sensor 53. Output control circuit 52 performs the optical system inspection process of inspecting the conditions of the optical system and wavelength conversion member 4a and the light source inspection process of inspecting the condition of light source 6 in accordance with the monitor signal, using a time division method.

Accordingly, it is possible to individually detect anomalies in the optical system and the wavelength conversion member and an anomaly in each light-emitting device of light source 6. In lighting system 1 according to the present embodiment, only one optical sensor 53 is used to inspect the optical system and wavelength conversion member 4a and to inspect light source 6. This simplifies the configuration.

In lighting system 1 according to the present embodiment, in the light source inspection process, output control circuit 52 reduces the amplification factor of monitor signal Y1 in optical sensor 53, and in the optical system inspection process, output control circuit 52 does not necessarily have to reduce the amplification factor.

Thus, when monitor signal Y1 in optical sensor 53 becomes saturated, it is possible to bring the amount of monitor light L3 into one-to-one correspondence with monitor signal Y1 and to accurately measure the amount of monitor light L3.

In lighting system 1 according to the present embodiment, at least one light-emitting device included in light source 6 includes a plurality of light-emitting devices. In the light source inspection process, when the intensity of monitor signal Y1 is reduced by a predetermined rate or more from the intensity of monitor signal Y1 in the previous light source inspection process, output control circuit 52 may identify a light-emitting device that has a reduced output from among the plurality of light-emitting devices, by detecting a change in monitor signal Y1 when the power supplied to each light-emitting device is sequentially changed.

In this way, it is possible to individually inspect a plurality of light-emitting devices and to accurately identify one light-emitting device that has a reduced output. For example, as in lighting system 1 according to the present embodiment, a change in monitor signal Y1 may be detected by sequentially establishing a short-circuit across each light-emitting device (i.e., sequentially making zero the power supplied to each light-emitting device).

In lighting system 1 according to the present embodiment, output control circuit 52 may alternately perform the light source inspection process and the optical system inspection process.

In this case, it is possible to detect anomalies in the light source, the optical system, and other constituent elements without delay.

In lighting system 1 according to the present embodiment, each of at least one light-emitting device included in light source 6 may be a semiconductor laser device, and the optical system may include light guide member 3 that guides the first light (i.e., laser light L1).

In this case, it is possible, by using light guide member 3, to readily guide high-luminance laser light L1 outputted from the semiconductor laser devices to wavelength conversion member 4a.

The method of controlling lighting system 1 according to the present embodiment includes the optical system inspection process of inspecting the conditions of the optical system and wavelength conversion member 4a in accordance with monitor signal Y1, and the light source inspection process of inspecting the condition of light source 6 in accordance with monitor signal Y1. The light source inspection process and the optical system inspection process are performed using a time division method.

Accordingly, it is possible to individually detect anomalies in the optical system and the wavelength conversion member and an anomaly in each light-emitting device of light source 6. Besides, in the method of controlling lighting system 1 according to the present embodiment, only one optical sensor 53 is used to inspect the optical system and wavelength conversion member 4a and to inspect light source 6. This simplifies the configuration of lighting system 1.

[Variations and Other Modifications]

While the lighting system and so on according to a plurality of aspects of the present disclosure have been described with reference to the embodiment, the present disclosure is not limited to this embodiment. The present disclosure also includes modes obtained by making various modifications conceivable by those skilled in the art to the embodiment and modes constituted by any combination of constituent elements in different embodiments without departing from the scope of the present invention.

For example, according to the embodiment, the light-emitting device inspection process is performed in the case where it is determined twice in succession in the light source inspection process that the amount of reduction of the detection value from the reference value is greater than the second threshold value. However, the configuration of the light source inspection process is not limited thereto. For example, the light-emitting device inspection process may be performed in the case where it is determined even only once that the amount of reduction is greater than the second threshold value, or in the case where it is determined three times in succession that the amount of reduction is greater than the second threshold value.

In the above-described embodiment, output control circuit 52 reduces the amplification factor of monitor signal Y1 in optical sensor 53 in the light source inspection process, but the amplification factor does not necessarily have to be reduced. For example, even in the case where the amplification factor is not reduced, the amplification factor does not necessarily have to be reduced in the light source inspection process if the amount of monitor light L3 is in one-to-one correspondence with monitor signal Y1.

In the above-described embodiment, light guide member 3 is used as the optical system, but the configuration of the optical system is not limited to light guide member 3 as long as the optical system is capable of receiving the first light and applying the first light to wavelength conversion member 4a. For example, an optical element such as a mirror or a lens may be used as the optical system.

In the above-described embodiment, in order to change the current supplied to each light-emitting device in the light source inspection process, the switch connected in parallel with that light-emitting device is short-circuited so as to zero the current flowing through the light-emitting device. However, the mode of the light source inspection process is not limited thereto. For example, in the light source inspection process, the current supplied to each light-emitting device may be reduced to a current amount that is greater than zero. Specifically, a circuit that connects switches and resistances in series may be connected in parallel with each light-emitting device.

In the light source inspection process according to the above-described embodiment, the light-emitting device inspection process is performed in the case where it is determined twice in succession that the rate of reduction of the detection value from the reference value is greater than the second threshold value, but the light-emitting device inspection process may be performed in the case where it is determined even only once that the rate of reduction of the detection value from the reference value is greater than the second threshold value.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting system, comprising:
   a light source that includes at least one light-emitting device and emits first light;
   a wavelength conversion member that converts part of the first light into second light having a different wavelength from a wavelength of the first light;
   an optical system where the first light enters and that applies the first light to the wavelength conversion member;
   an optical sensor that receives part of the second light as monitor light and outputs a monitor signal corresponding to an intensity of the monitor light; and
   an output control circuit that controls the light source and the optical sensor,
   wherein the output control circuit performs an optical system inspection and a light source inspection in accordance with the monitor signal, using a time division method, the optical system inspection being an inspection of conditions of the optical system and the wavelength conversion member, and the light source inspection being an inspection of a condition of the light source, and
   in the light source inspection, the output control circuit reduces an amplification factor of the monitor signal in the optical sensor, and in the optical system inspection, the output control circuit does not reduce the amplification factor.

2. A lighting system, comprising:
   a light source that includes at least one light-emitting device and emits first light;
   a wavelength conversion member that converts part of the first light into second light having a different wavelength from a wavelength of the first light;
   an optical system where the first light enters and that applies the first light to the wavelength conversion member;
   an optical sensor that receives part of the second light as monitor light and outputs a monitor signal corresponding to an intensity of the monitor light; and an output control circuit that controls the light source and the optical sensor, wherein the output control circuit performs an optical system inspection and a light source inspection in accordance with the monitor signal, using a time division method, the optical system inspection being an inspection of conditions of the optical system and the wavelength conversion member, and the light source inspection being an inspection of a condition of the light source, the at least one light-emitting device includes a plurality of light-emitting devices, and in the light source inspection, when the intensity of the monitor signal is reduced by a predetermined rate or more from the intensity of the monitor signal in a previous light source inspection, the output control circuit identifies a light-emitting device that has a reduced output from among the plurality of light-emitting devices, by detecting a change in the monitor signal when power supplied to each of the plurality of light-emitting devices is sequentially changed.

3. The lighting system according to claim 1, wherein the output control circuit alternately performs the light source inspection and the optical system inspection.

4. The lighting system according to claim 1, wherein each of the at least one light-emitting device is a semiconductor laser device, and the optical system includes a light guide member that guides the first light.

5. A method of controlling a lighting system, the lighting system including:
   a light source that includes at least one light-emitting device and emits first light;
   a wavelength conversion member that converts part of the first light into second light having a different wavelength from a wavelength of the first light;
   an optical system where the first light enters and that applies the first light to the wavelength conversion member; and
   an optical sensor that receives part of the second light as monitor light and outputs a monitor signal corresponding to an intensity of the monitor light,
   the method of controlling a lighting system, comprising:
   (i) inspecting conditions of the optical system and the wavelength conversion member in accordance with the monitor signal; and
   (ii) inspecting a condition of the light source in accordance with the monitor signal,
   wherein (i) and (ii) are performed using a time division method, and
   in (ii), an amplification factor of the monitor signal in the optical sensor is reduced, and in (i), the amplification factor is not reduced.

6. The lighting system according to claim 2, wherein the output control circuit alternately performs the light source inspection and the optical system inspection.

7. The lighting system according to claim 2, wherein each of the at least one light-emitting device is a semiconductor laser device, and the optical system includes a light guide member that guides the first light.

8. The method of controlling a lighting system according to claim 5, wherein the light source inspection and the optical system inspection are alternatively performed.

9. The method of controlling a lighting system according to claim 5, wherein the at least one light-emitting device is a semiconductor laser device, and the optical system includes a light guide member that guides the first light.

10. A method of controlling a lighting system, the lighting system including:
    a light source that includes at least one light-emitting device and emits first light;
    a wavelength conversion member that converts part of the first light into second light having a different wavelength from a wavelength of the first light;
    an optical system where the first light enters and that applies the first light to the wavelength conversion member; and
    an optical sensor that receives part of the second light as monitor light and outputs a monitor signal corresponding to an intensity of the monitor light,
    the method of controlling a lighting system, comprising:
    (i) inspecting conditions of the optical system and the wavelength conversion member in accordance with the monitor signal; and
    (ii) inspecting a condition of the light source in accordance with the monitor signal,
    wherein (i) and (ii) are performed using a time division method,
    the at least one light-emitting device includes a plurality of light-emitting devices, and
    in (ii), when the intensity of the monitor signal is reduced by a predetermined rate or more from the intensity of the monitor signal in a previous light source inspection, the output control circuit identifies a light-emitting device that has a reduced output from among the plurality of light-emitting devices, by detecting a change in the monitor signal when power supplied to each of the plurality of light-emitting devices is sequentially changed.

11. The method of controlling a lighting system according to claim 10, wherein the light source inspection and the optical system inspection are alternatively performed.

12. The method of controlling a lighting system according to claim 10, wherein the at least one light-emitting device is a semiconductor laser device, and the optical system includes a light guide member that guides the first light.

* * * * *